Figure 6:
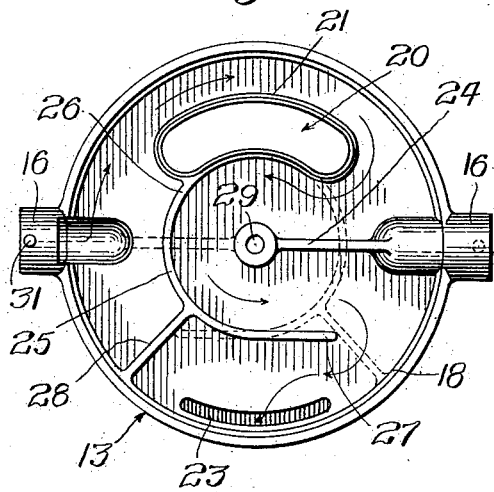

C. A. RAGGIO.
DAMPER FOR FURNACES.
APPLICATION FILED DEC. 23, 1913.
1,119,041.
Patented Dec. 1, 1914.
3 SHEETS—SHEET 1.
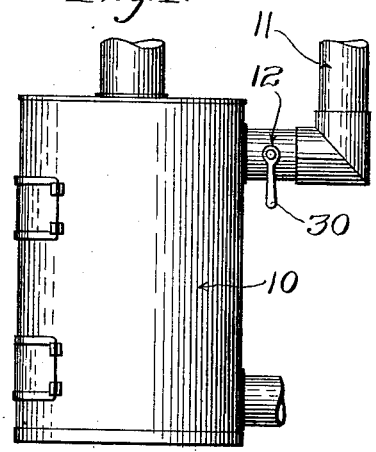
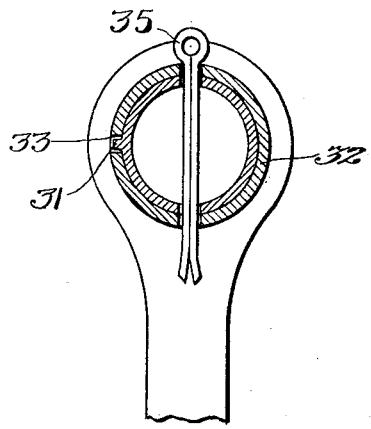
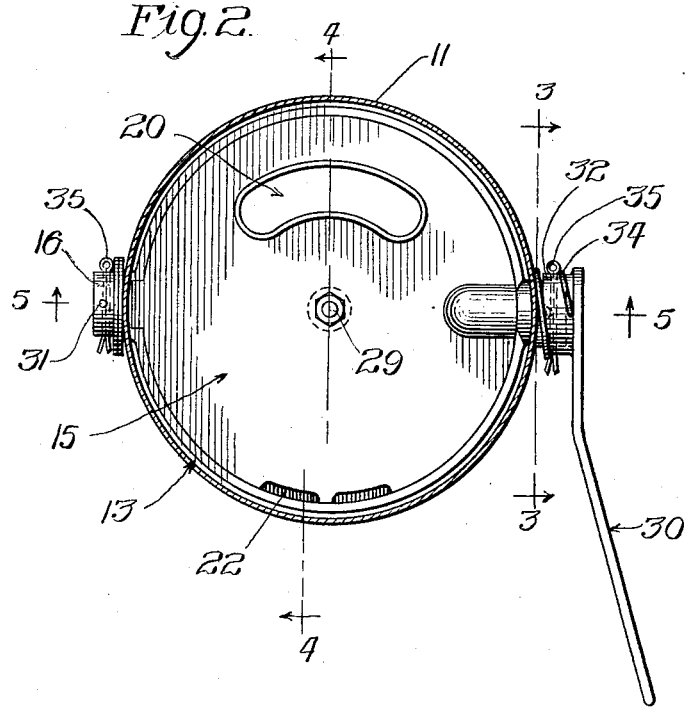
Witnesses:
Harry S. Gaither
Inventor
Charles A. Raggio
by Baumig & Baumig
Attys.

C. A. RAGGIO.
DAMPER FOR FURNACES.
APPLICATION FILED DEC. 23, 1913.

1,119,041.

Patented Dec. 1, 1914.

3 SHEETS—SHEET 2.

Witnesses:
Harry S. Gaither
Wm. P. Bond

Inventor
Charles A. Raggio
by Ramney & Ramney
Attys.

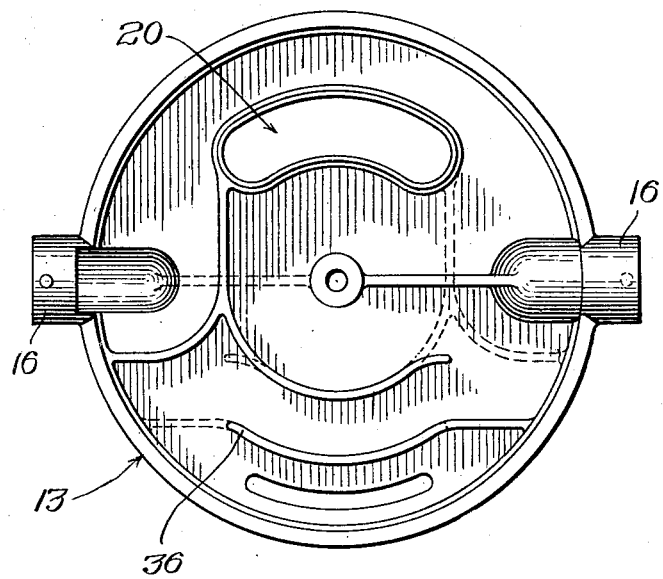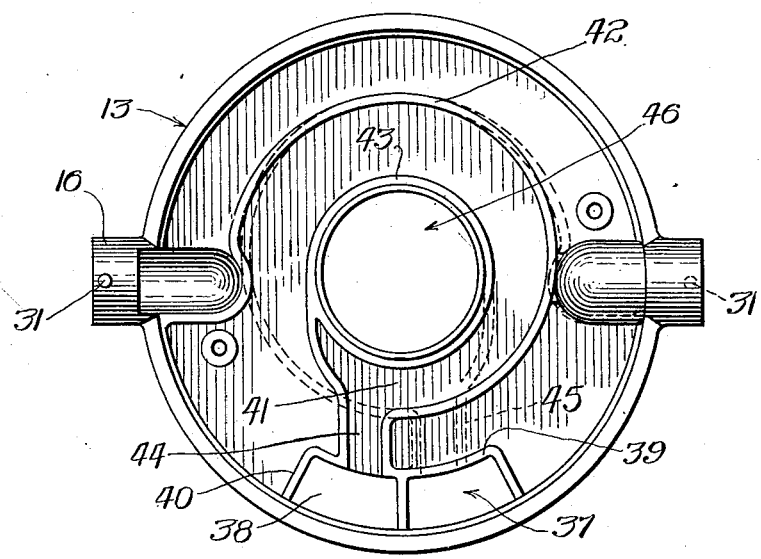

UNITED STATES PATENT OFFICE.

CHARLES A. RAGGIO, OF CHICAGO, ILLINOIS.

DAMPER FOR FURNACES.

1,119,041.  Specification of Letters Patent.  Patented Dec. 1, 1914.

Application filed December 23, 1913. Serial No. 808,388.

*To all whom it may concern:*

Be it known that I, CHARLES A. RAGGIO, a citizen of the United States, residing at Chicago, in the county of Cook and State of Illinois, have invented certain new and useful Improvements in Dampers for Furnaces, of which the following is a specification.

The present invention has reference to certain improvements in furnace dampers of the type intended for use in the flues leading from the furnace to the chimney.

More particularly the invention has reference to certain improvements in dampers of the foregoing type, and which are intended to permit the entrance of fresh air into the flue, which fresh air flows by a counter current movement back through the flue into the furnace. The admission of the fresh air into the furnace in this manner serves to supply the necessary oxygen for carrying on the combustion within the furnace at the ordinary or normal rate or intensity, without the necessity of leaving the furnace or ash pit doors open during normal operation.

The main object of the invention is to provide a damper of peculiar construction such that the incoming air is caused to pass through the body of the damper to be thereby heated by the waste heat which is going up the flue. In this manner a considerable portion of the waste heat is conserved so that the efficiency or economy of the furnace is greatly improved. At the same time the preheating of the air permits the attainment of a higher temperature of combustion than would otherwise be possible.

In connection with the foregoing object another object is to so design and construct the damper that the incoming air will be forced to travel through passages of considerable length within the damper, thereby maintaining the incoming air in contact with the surface of the damper for as long a period as possible.

Still another object of the invention in connection with the foregoing is to so construct the damper that the fresh air may be simultaneously admitted to both sides of the damper, the air admitted to one side traveling through the body of the damper adjacent to one of the faces thereof, and the air admitted to the other side of the damper traveling through the body of the damper adjacent to the other surface thereof.

Another object of the invention is to so construct the damper that it can be readily inserted into the flue without the necessity of specially constructing the flue and without the necessity of cutting or opening the flue other than the forming of a pair of oppositely disposed holes in the flue.

Still another object of the invention is to so construct the damper that the fresh air admitted through it will be delivered into the bottom portion of the flue where it will be separated as much as possible from the outgoing hot burned gases, thereby obtaining the aforementioned counter current movement with a minimum of interference between the incoming fresh air and the outgoing burned gases.

In this connection a still further object is to provide the damper with an operating handle, whereby its position can be controlled from time to time, and to so form the said handle or its connection to the damper that, when the handle is connected to either side of the damper, it will maintain such a definite relationship to the delivery opening in the damper that an indication will always be given as to when the said opening stands in the lower portion of the flue. In this connection it is also desired to provide a construction such that the handle may be connected to either side of the damper as desired, assurance being had that the position of the handle will always give the proper indication as to the position of the air inlet opening in the lower portion of the damper.

Other objects and uses will appear from a detailed description of the invention which consists in the features of construction and combinations of parts hereinafter described and claimed.

Figure 7:
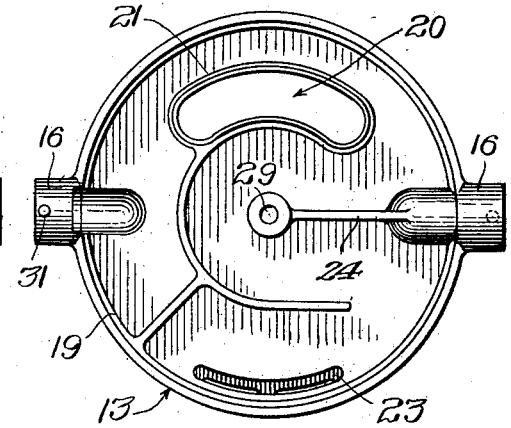
Figure 5:
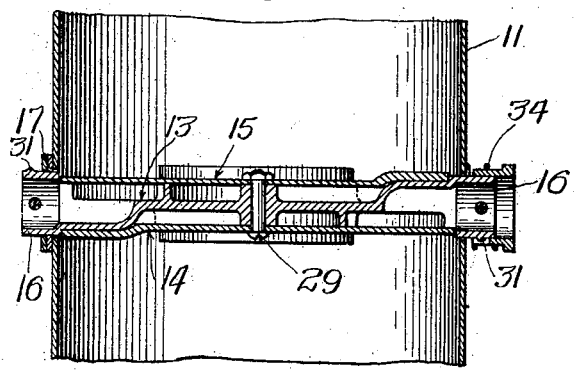
Figure 4:
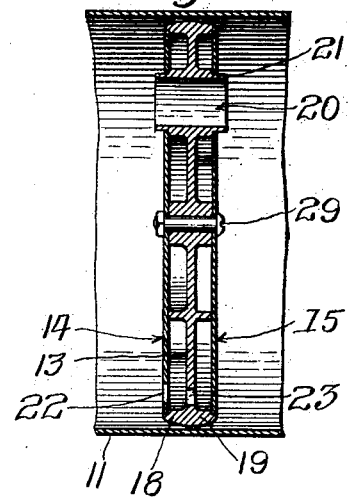

In the drawings: Figure 1 shows a side view of one form of furnace having a damper embodying the features of the present invention connected into the flue leading to the chimney; Fig. 2 shows a cross section through the flue with the damper mounted in position, the damper standing in normal or operating position; Fig. 3 shows a section taken on the line 3—3 of Fig. 2, looking in the direction of the arrows; Fig. 4 shows a vertical section through the damper mounted in position within the flue being taken on the line 4—4 of Fig. 2, looking in the direction of the arrows; Fig. 5 shows a horizontal section through the damper mounted in position within the flue being taken on the line 5—5 of Fig. 2, looking in the direction of the arrows; Fig. 6 is a front view of the damper with the front plate removed; Fig. 7 is a back view of the damper with the back plate removed; Fig. 8 is a front view of a modified construction of damper, the front plate being removed; and Fig. 9 is a front view of another modification also with the front plate removed.

In Fig. 1, the furnace is designated by the numeral 10, and the flue leading to the chimney by the numeral 11. As indicated in this figure, the damper 12, to which the present invention relates, is to be located in the flue 11, and preferably close up to the point of connection of said flue into the furnace. As previously stated, it has been found by experience that fresh air may be admitted into the lower portion of the flue at a point close up to the furnace, which air will drop back into the furnace to supply the necessary oxygen for consumption without the necessity of opening the furnace or ash pit doors.

In each of the several damper constructions illustrated in the drawings, there is provided a body portion 13 against which the front and back plates 14 and 15 respectively lie. The body portion is provided on each side with an outstanding hollow arm or the like 16, which arms serve as bearings or pivotal points for the damper itself. These arms can be readily inserted through holes 17 in the sides of the flue, so that the damper, to which the present invention relates, can be connected into the flue by the drilling of said holes and by distorting the shape of the flue a slight amount to allow the arms to be inserted. The body portion 13 of the damper is so constructed that the hollow arm at one side communicates with the front face of the body portion, while the hollow arm at the other side communicates with the rear face thereof. This construction is well illustrated in Fig. 5. Encircling the edges of the body portion 13 are the flanges 18 and 19, which protrude from the front and rear faces respectively. The front and back cover plates rest against these flanges. It, therefore, follows that an air space is provided on each side of the damper, one air space being closed by the front cover plate, and the other by the rear cover plate. It also follows that these air spaces communicate with the outer air through the medium of the two hollow arms respectively.

The central portion of the body of the damper is provided with a gas perforation 20, through which passes the burned gas in its travel from the furnace to the chimney. As shown in Figs. 2, 4, 6, 7, and 8, it is preferred that this perforation be located in the upper portion of the damper, inasmuch as the hotter gases will travel along the upper portion of the flue. Furthermore, by adopting this arrangement, the incoming air will be effectively separated from the outgoing hot gases, so that the current of air will be delivered to the furnace in as pure a state or condition as possible, and with a minimum amount of mixture or dilution with the burned gases. Surrounding the opening 20 at each side of the body portion is a rib or flange 21, which ribs or flanges seat against the edges of corresponding openings in the front and back cover plates.

The lower portion of the back cover plate is continuous and unperforated, whereas the lower portion of the front cover plate is provided with one or more delivery openings 22, through which the incoming air is delivered into the lower portion of the flue. In the arrangement shown in Figs. 2 to 7 inclusive, the air coming down through the space of the damper in contact with the front cover plate 14 is delivered directly to the openings 22 into the lower portion of the flue. In order to permit the air which is traveling through the space in contact with the back cover plate 15 to reach the openings 22, I provide an opening 23 in the lower portion of the body of the damper. It, therefore, follows that the fresh air incoming through both of the hollow arms is ultimately delivered through the openings 22 into the bottom portion of the flue, approximately one-half traveling through the damper adjacent the front cover plate, and the other half traveling through the damper adjacent the rear cover plate.

In order to insure a maximum length of travel of the two portions of the incoming air adjacent to their respective cover plates, I have provided partitions within the damper for causing the air to circulate back and forth before being ultimately delivered through the openings 22. In the arrangement shown in Figs. 6 and 7, a rib or partition 24 extends radially on each side of the body portion from the center thereof approximately to the periphery thereof. Another partition 25 extends in a curving manner from a point of junction 26 with the corresponding rib 21 to a point 27, and still another partition 28 extends radially from the partition 25 to the edge of the damper. These partitions extend out a sufficient distance to rest or contact against the respective cover plates, so that zigzag channels or passages are provided through which the incoming air is forced to travel back and forth before it reaches the delivery outlet 22. The movement of the air in the arrangement shown in Figs. 6 and 7 is clearly indicated by the arrows.

Inasmuch as the currents of incoming air flowing through the two halves of the damper come from the opposite sides thereof, it follows that the two streams of currents of air are traveling in opposite directions at every point throughout their movement, so that a maximum of heat absorption is obtained, and, consequently, the incoming air will be heated to the maximum possible degree. For this reason, the efficiency or economy of operation of the furnace will be materially improved, inasmuch as the amount of heat absorbed by the incoming air is a substantial measure of the saving in fuel consumption necessary to heat the air, if it be not preheated. Obviously any suitable means may be provided for retaining the cover plates in position with respect to the body portion 13. In the particular arrangement shown in Figs. 6 and 7, such retaining means takes the form of a bolt or the like 29.

It is frequently desirable to be able to manipulate the damper, and for this purpose a handle or the like 30 is provided. This handle may be conveniently connected to either of the outstanding perforated arms 16 according to convenience. However, as one feature of my invention I so relate this handle to the damper that the handle gives an indication as to the position of the air opening 22, so that the operator can tell when this opening stands in the lower portion of the flue. For this purpose, a lug or the like 31 is formed on each of the outstanding hollow arms, but the lug on one of the arms faces forward, while that on the other arm backward. The handle is provided with a sleeve 32 adapted to slip over the hollow arm, said sleeve being in turn provided with a notch or the like 33 at the proper side for the reception of the corresponding lug 31. Inasmuch as the two lugs face in opposite directions, it follows that the arm will always stand in the same position with respect to the opening 22, regardless of which of the hollow arms it may be mounted on. For example, in the arrangement illustrated in Figs. 1 and 2, the arm depends or hangs down. A spring 34 may be mounted on the sleeve 32, the one end of said spring bearing against the flue, and the other end bearing against the arm 30. This spring simply creates a pressure or friction on the arm which will hold the damper in any position into which it may be set. Cotter pins or the like 35 may be provided for holding the damper properly in position within the flue.

The arrangements shown in Figs. 8 and 9 differ from that previously described, chiefly in the form and arrangement of the partitions, and, consequently, in the shape and form of the air passages through the damper. The main difference between the arrangement shown in Figs. 6 and 7 and that shown in Fig. 8 is, that in the last named figure, there is provided an additional partition 36, so that an additional turn or bend is given to the air in its travel. In the arrangement shown in Fig. 9, the air travels in a spiral direction from each of the hollow arms to the point of delivery in the lower portion of the flue. Fig. 9 is a face view looking at the front of the damper with the front cover plate removed. The heated air is delivered toward the observer. For this purpose a perforation 37 extends through the body of the damper from the back to the front thereof, said perforation lying alongside of a pocket 38 on the front side of the damper. The partitions 39 and 40 surround the opening and the pocket respectively, the opening in the front cover plate being of a size and shape to uncover the opening 37 and the pocket 38, but to contact with the partitions 39 and 40. The air coming in from the left side travels in a spiral direction to the point 41, being guided in said travel by the partitions 42 and 43. A tube or pipe 44 leads from the point 41 into the pocket 38, the air at the front side of the damper passing beneath said pipe in its spiral travel. Similarly a tube or pipe 45 delivers the air at the back of the damper to the opening 37. The partition 43 is circular in form and incloses the opening 46, which in this case is the opening through which the hot gases are traveling to the chimney.

While I have herein shown and described only three forms of construction embodying features of my invention, still it will be understood that I am in no wise restricted to the said forms, except as may be called for in the claims, but that I include within the scope of my invention other equivalent arrangements operating in equivalent manners to produce equivalent results.

I claim:

1. A damper of the class described, comprising a central body portion having a pair of oppositely disposed hollow pivotal supporting portions, the inner ends of the perforations of said supporting portions communicating with the opposite faces of the body portion, and a plate mounted on each side of the body portion to provide a chamber thereagainst, there being an opening in one of said plates, and both of the chambers communicating with said opening.

2. A damper of the class described, comprising a body portion having a pair of oppositely disposed hollow pivotal supporting portions, the perforations of said supporting portions communicating with opposite faces of the body member, a plate mounted on each side of the body portion to provide a chamber thereagainst, there being an opening in one of said plates, and a plurality of partitions within each chamber to provide air passageways therein, both of said passageways communicating with said opening.

3. A damper of the class described, comprising a body portion having a pair of oppositely disposed hollow pivotal supporting portions, the perforations in said supporting portions communicating with the opposite faces of the body portion, a plate mounted adjacent to each face of the body portion to provide a chamber thereagainst; there being a discharge opening in one of said plates, a plurality of partitions in each chamber to provide a passageway for air therein, both of said passageways terminating in communication with said opening, and there being an opening extending through both of the plates and through the body portion out of communication from said passageways.

4. A damper of the class described, comprising a hollow member having a partition dividing its interior portion into front and back chambers, the hollow member being provided with sidewise extending pivotal portions, each pivotal portion being perforated, the perforations of the pivotal portions communicating with the aforesaid chambers and being adapted to supply fresh air to said chambers, there being an opening establishing communication from said chambers to the exterior of the damper.

5. A damper of the class described, comprising a hollow member having a partition dividing its hollow portion into front and rear chambers, the damper having a pair of oppositely disposed pivotal members, each pivotal member being perforated and the perforations of the pivotal members communicating with the aforesaid chambers to supply fresh air to said chambers, there being an opening in the damper establishing communication between the chambers and the exterior of the damper, and there being an inclosing partition extending through the damper and through the chambers to provide a perforation from front to rear of the damper out of communication from the chambers.

6. A damper of the class described, comprising a hollow member having a dividing partition serving to divide the hollow portion thereof into front and rear chambers, there being a perforation in the lower portion of said partition, and there being a perforation in the lower portion of the front of the damper, and there being openings in the side portions of the damper to permit the entrance of air to the chambers.

7. A damper of the class described, comprising a hollow member having a partition serving to divide the hollow portion into front and rear chambers, there being a perforation in the lower portion of said partition, and there being a perforation in the lower portion of the front of the damper, and there being openings in the damper to permit the entrance of air separately to the two chambers.

8. A damper of the class described, comprising a hollow member having a partition serving to divide the hollow portion thereof into front and rear chambers, there being openings in the damper to permit the entrance of air separately to said chambers, and there being openings in the lower portion of the damper to permit the exit of air from the chambers to the outside of the damper, substantially as described.

9. A damper of the class described, comprising a hollow member having a partition serving to divide the hollow portion thereof into front and rear chambers, and having another inclosing partition extending from front to back and serving to permit the passage of gas through the damper out of communication from the chambers, there being openings in the damper to permit the inflow of air separately to the chambers, and there being other openings in the lower portion of the damper to permit the delivery of heated air from the damper to the outside thereof.

CHARLES A. RAGGIO.

Witnesses:
THOMAS A. BANNING, Jr.,
FRANCES M. FROST.

Copies of this patent may be obtained for five cents each, by addressing the "Commissioner of Patents, Washington, D. C."